United States Patent [19]

Ando et al.

[11] Patent Number: 4,876,977
[45] Date of Patent: Oct. 31, 1989

[54] SELECTED PATTERN DISPLAY DEVICE OF SEWING MACHINE

[75] Inventors: Takumi Ando; Takayuki Kawasato, both of Tokyo, Japan

[73] Assignee: Janome Sewing Machine Company Limited, Japan

[21] Appl. No.: 184,851

[22] Filed: Apr. 22, 1988

[30] Foreign Application Priority Data

Apr. 24, 1987 [JP] Japan .................................. 62-99694
Mar. 11, 1988 [JP] Japan .................................. 63-56121

[51] Int. Cl.$^4$ .............................................. D05B 3/02
[52] U.S. Cl. .................................... 112/445; 112/453
[58] Field of Search ............... 112/445, 453, 454, 456, 112/457, 458, 121.11, 121.12

[56] References Cited

U.S. PATENT DOCUMENTS 4,341,170  7/1982  Beckerman et al. ................. 112/445
4,577,574  3/1986  Takahashi ........................... 112/445

*Primary Examiner*—Peter Nerbun
*Attorney, Agent, or Firm*—William A. Drucker

[57] ABSTRACT

A selected pattern display device of a sewing machine is disclosed wherein pattern selecting means is selectively operated to select stitch data for a pattern from a plurality of patterns including a straight stitch pattern stored in pattern storage means, amplitude selecting means is selectively operated to select a numeral value for determining the amplitude of the selected pattern, and display means is provided to display the selected pattern and the numeral value of the selected pattern, discriminating means is responsive to operation of the pattern selecting means to discriminate if the selected pattern is the straight stitch pattern, the discriminating means producing a signal, if the selected pattern is the straight stitch pattern, straight display data storage means is responsive to the signal from the straight stitch pattern discriminating means and a numeral value selected by operation of the amplitude selecting means to produce graphic data representing the straight stitch pattern of a determined needle position within a predetermined maximum needle swingable range, which is displayed in the display means.

4 Claims, 4 Drawing Sheets (a)

(b)

SELECTED PATTERN DISPLAY DEVICE OF SEWING MACHINE

BACKGROUND OF THE INVENTION

1. Field of the Invention

The present invention relates to a selected pattern display device of a sewing machine and particularly to the display of straight stitch pattern in relation with a needle position within a predetermined maximum needle swingable range.

2. Description of the prior art

In conventional sewing machine, if a pattern to be stitched is selected, the pattern is indicated in a display 21 and a desired amplitude of the pattern is indicated in another display 23 by a digital numeral produced by 7-segment light emitting diodes (LED) as shown in FIG. 6. In this case, if a straight stitch pattern is selected, the straight stitch pattern is indicated in the display 21 and the needle position is optionally selected and indicated in the display 23 with a digital numeral, for example, 7.0 representing the needle, position located at a predetermined point within a laterally elongated needle dropping hole of a predetermined maximum range in which the needle may be swingable.

According to such a prior art as described above, it is difficult to visually recognize the needle postion of the straight stitching which is one of plural straight stitch needle positions within the predetermined maximum needle swingable range, because it is often required to sew a work with an optional combination of straight stitch patterns of different needle positions.

SUMMARY OF THE INVENTION

The present invention has been elaborated to realize a display device of a sewing machine which enables a machine operator to make an easy visual identification of the needle position of selected straight stitching with respect to the needle dropping hole.

In short, the present invention substantially comprises a pattern selecting means; a needle swing amplitude selecting means; stitch data converting means for defining a straight stitch needle position corresponding to the selected amplitude value, means for discriminating if a selected pattern is a straight stitch pattern or not; and display means for displaying the selected straight stitch pattern with a needle position corresponding to the selected amplitude value as a graphic drawing in relation with the needle dropping hole of a predetermined maximum needle swingable range.

Since the present invention is constructed as described above and operates to display the straight stitching together with the needle dropping hole as a graphic drawing representing a needle position on a selected pattern display part, it enables an easy visual recognition of the needle position of straight stitching in a sewing operation.

BRIEF DESCRIPTION OF THE DRAWINGS

FIGS. 1 to 5 illustrate an embodiment of the present invention; out of which FIG. 1 is a system block diagram, FIG. 2 a more precise block diagram, FIG. 3 a front view of a sewing machine provided with the invention, and FIGS. 4 and 5 illustrations of display part.

DESCRIPTION OF THE PREFERRED EMBODIMENT

Figure 1:
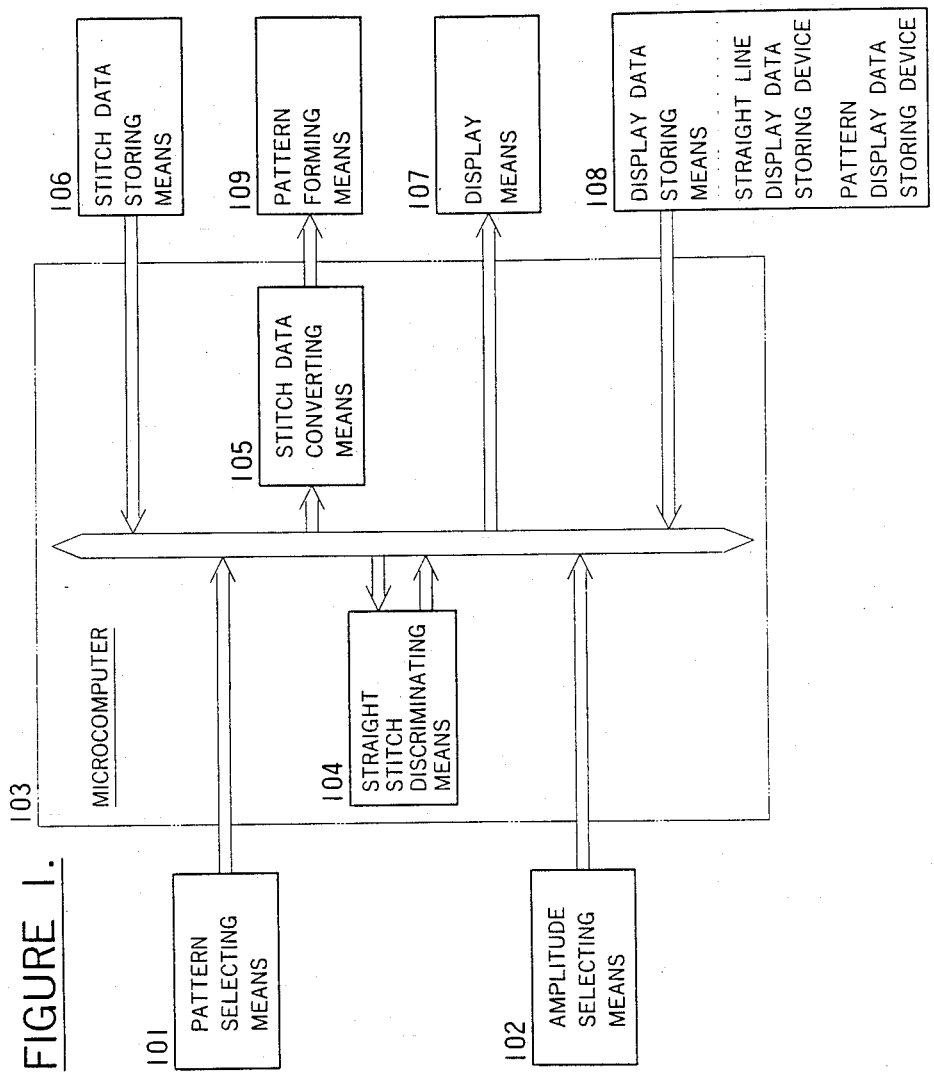
Figure 5:
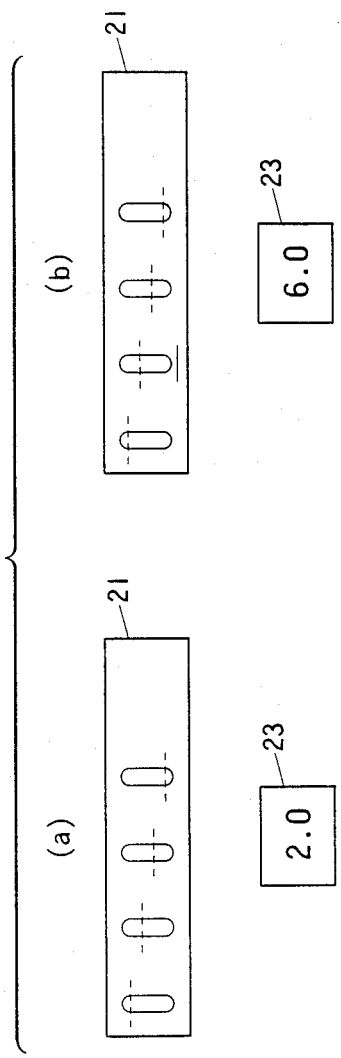

The basic construction of the embodiment of the present invention is such as shown in the system block diagram of FIG. 1, in which stitch data storing means 106 is a device storing stitching pattern data of various kinds of patterns including the straight stitch pattern, pattern selecting means 101 is a device manually operated to select one or more patterns from the stitch data storing means 106, amplitude selecting means 102 is a device manually operated to select a needle swing (or stitch) amplitude value for a selected stitch pattern, a microcomputer 103 comprises a straight stitch discriminating means 104 which is a device for discriminating if a selected pattern is a straight stitch pattern or not and stitch data converting means 105 which is a device for making calculations on the basis of a selected stitch pattern data and a selected amplitude value so as to provide an amplitude adjusted pattern, said stitch data converting device being responsive to the straight stitch pattern data from the stitch data storing means and the amplitude value from the amplitude selecting means to convert the amplitude value into a value for defining a needle position of the straight stitch pattern with respect to a generally known laterally elongated needle dropping hole of a maximum needle swingable range formed on a needle plate, display data storing means 108 is a device normally storing pattern display data for various stitch patterns including groups of data for graphically displaying a plurality of patterns composed of a series of straight stitches located at different positions within the laterally elongated needle dropping hole as shown in FIG. 5(a), display means 107 is a device for displaying a selected stitching pattern on the basis of display data to be read out from the display data storing means, and a pattern forming means 109 is a device for forming the stitches of a selected pattern on the basis of the stitch data.

When the sewing operator selects the straight stitch pattern and an optional amplitude by manually operating the pattern selecting means 101 and the amplitude selecting means 102 in the arrangement constructed as described above, straight stitch data is readout from the stitch data storing means 106 and is modified by the data converting means 105, so that the straight stitch pattern may be produced with a needle position within needle dropping hole as determined by the selected amplitude value. Namely, the straight stitch data is sent to the pattern forming means 109, so as to execute the straight stitching whose needle position is set according to the selected amplitude value.

Figure 4B:
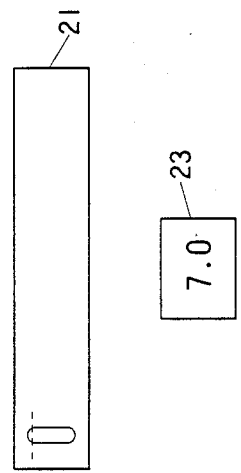

On the other hand, when it is discriminated by the straight stitching discriminating means 104 that the straight stitch pattern and the optional amplitude have been selected, one of of the groups of graphic display data is read out from the display data storing means 108, and is sent to the display means 107, which is then operated to display therein are of the graphic patterns as shown in FIG. 4(b) showing the needle position with respect to the laterally elongated needle dropping hole as determined by the selected amplitude value.

In the case when any pattern other than the straight stitching and the amplitude are selected, the pattern read out from the display data storing means 108 and is displayed as a graphic drawing on the display means 107, while the selected amplitude value is displayed as a numeral on an amplitude value display part, as will be described later in detail.

Figure 2:
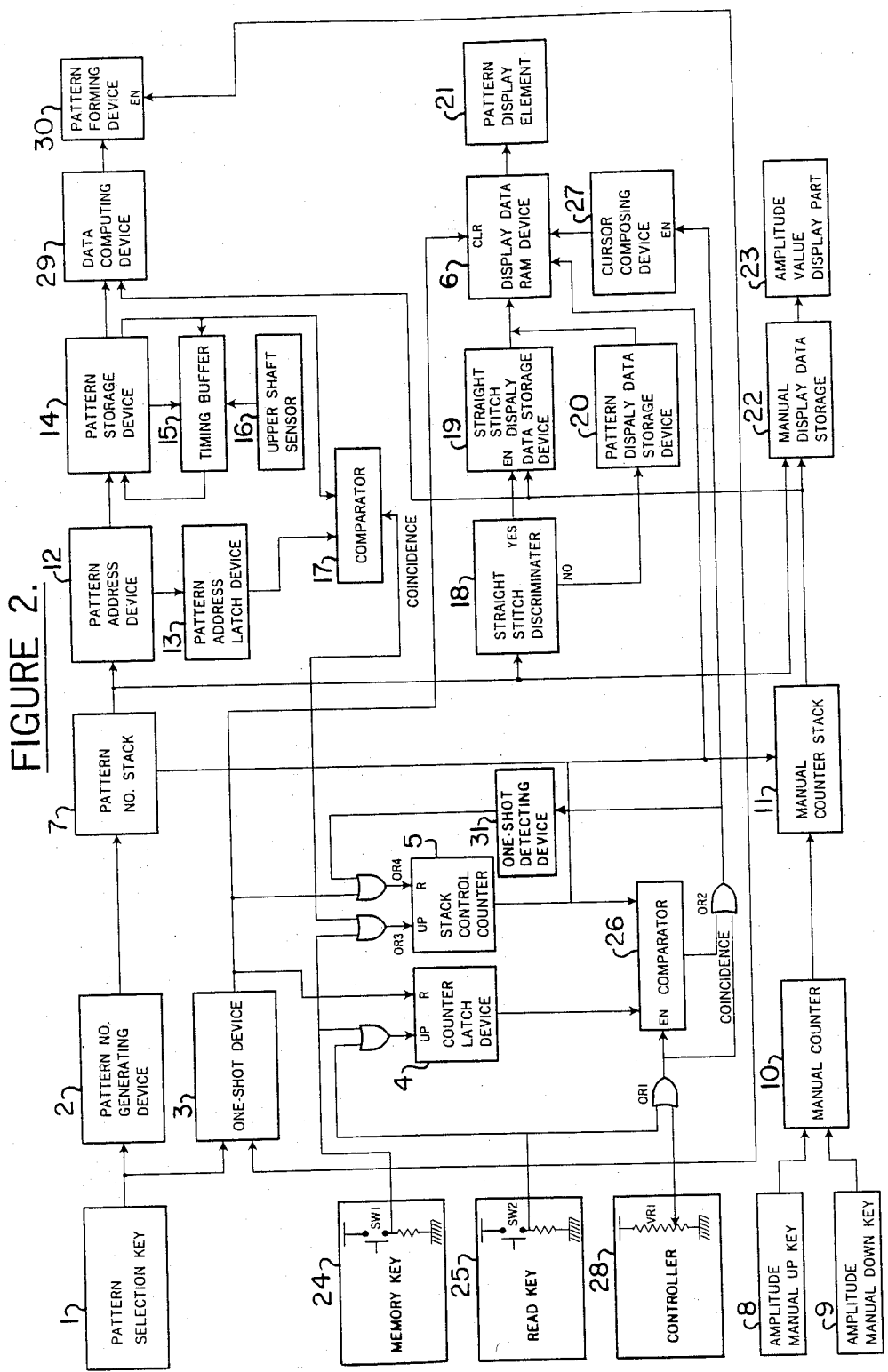

Next, the above-described embodiment will be described in more detail on the basis of FIG. 2. First, the construction thereof is as follows.

A pattern selection key 1, which corresponds to the pattern selecting means 101 in FIG. 1, is a device for a sewing operator to select a pattern, while an amplitude manual UP key 8 and an amplitude manual DOWN key 9, which correspond to the amplitude selecting means 102 in FIG. 1, are devices for increasing and decreasing an amplitude value manually.

A pattern storage device 14 is a device which corresponds to the stitch data storing means 106 in FIG. 1, and which retrieves stitch pattern data corresponding to pattern numbers from a pattern number stack 7 when addressed, by a next address device, and deliever the same to a data computating device 29.

A pattern forming device 30 is a device which corresponds to the pattern forming means 109 of FIG. 1 and which is operated by a controller 28 controlling the speed of rotation of an upper shaft of a sewing machine and forms a stitch pattern on the basis of data from the data computing device 29.

A display data RAM device 6 and a selected pattern display element 21 are devices constituting the display means 107 in FIG. 1. The display data RAM device 6 temporarily stores display data from a straight stitch display data storage device 19, pattern display data storage device 20 and a cursor composing device 27 and supplies the data to the selected pattern display part 21 which displays a pattern.

The straight stitch display data storage device 19 and the pattern display data storage device 20 are devices constituting the display data storing means 108 in FIG. 1. The straight stitch display data storage device 19 stores groups of data for graphically displaying a plurality of patterns composed of a series of straight stitches located at different positions within a laterally elongated needle dropping hole as shown in FIG. 5(a), and is enabled by a straight stitch discrimination signal from a straight stitch discriminator 18, and supplies a selected group of graphic data corresponding to a manual counter value, i.e. an amplitude value, taken out of a manual counter stack 11 to the display data RAM device 6, while the pattern display data storage device 20 stores display data of patterns other than straight stitching and is enabled by a discrimination signal of non-straight stitch pattern produced from the straight stitching discriminator 18, and produces the pattern display data corresponding to a pattern number taken out of a pattern number stack 7 to the display data RAM device 6.

An upper shaft sensor 16 is a device operated in synchronism with rotation of the arm shaft of sewing machine to produce a signal to a timing buffer 15, and a manual display data storage device 22 is a device delivering an amplitude value of a pattern other than straight stitching from the manual counter stack 11 to an amplitude value display part 23 which is a device for displaying the amplitude value. A memory key 24 is a device manually operated to produce a signal for temporaily storing a plurality of selected patterns in a memory as will be described in detail, and a read key 25 is a device outputting a signal for reading out the selected and stored patterns for checking or identifying them.

The above is a description of each input/output device for an electronic control unit shown as the microcomputer 103 in FIG. 1. Subsequently, a description will be made of device constituting said microcomputer 103.

The straight stitch discriminator 18 is a device which corresponds to the straight stitch discriminating means 104 in FIG. 1 and which receives as an input a pattern number from the pattern number stack 7 storing pattern numbers to be selected, and delivers a signal to the straight stitch display data storage device 19 when the selected pattern is straight stitching, and another signal to the pattern display data storage device 20 when the selected pattern is other than the straight stitch pattern.

The data computing device 29 is a device which corresponds to the stitching data converting means 105 in FIG. 1 and which executes computation on the basis of pattern data read out from the pattern storage device 14 and a manual counter value taken out of the manual counter stack 11, and delivers to the pattern forming device 30 the straight stitch data together with the manual counter value which is used to determine a needle position with respect to the laterally elongated needle dropping hole in case of straight stitching, and the pattern data of an amplitude value based on the manual counter value in any case other than the above, both data being delivered as stitch data.

A pattern number generating device 2 is a device which is responsive to operation of the pattern selecting key 1 to generate a pattern number signal corresponding to a pattern selected by the pattern selection key 1, and the pattern number stack 7 is a device for storing a pattern number signal or signals issued from the pattern number generating device 2 in a stack region or regions specified by a counter value of a stack control counter 5.

A one-shot device 3 is a device which is responsive to operation of the pattern selection key 1 after the controller 28 has been released, i.e. when the sewing machine is not running to reset each of a counter latch device 4, the stack control counter 5 and the display data RAM device 6. The counter latch device 4 is a counter device for latching the number of selected patterns, while the stack control counter 5 is a counter device controlling the retrieval of pattern numbers and manual values.

A manual counter 10 is a counter device which holds temporarily an amplitude value selected by the amplitude manual UP key 8 or the amplitude manual DOWN key 9, and the manual counter stack 11 is a device which stores a value of the manual counter 10 in a region specified by the stack control counter 4.

A pattern address device 12 is a device which receives as an input a pattern number signal taken out of an area of the pattern number stack 7 specified by the stack control counter 5, and delivers an initial address signal to a pattern address latch device 13 and the pattern data storage device 14 which stores pattern data of different patterns including wherein the pattern data corresponding to said pattern number.

The pattern address latch device 13 is a device for temporarily storing the initial address signal and gives the same to a comparator 17, and the timing buffer 15 is a device which is operated with a timing signal from the upper shaft sensor 16 to sequentially read out the pattern data from the pattern storage device 14 by sequentially addressing the next addresses of the selected pattern stored therein for the next stitches.

The comparator 17 is a device which gives a coincidence signal to the stack counter 5 through an OR 3 gate when the pattern data storage device 14 addresses the initial address of the selected pattern which is in accordance with the initial address latched in the latch device 13.

A comparator 26 is a device which is operated in response to a high-level signal from an OR 1 gate and delivers a coinsidence signal to an OR 2 gate when a value of the stack control counter 5 coinsides with a value of the counter latch device 4.

The cursor composing device 27 is a device which is operated in response to a high-level signal from the OR 2 gate and delivers cursor data to the display data RAM device 6, and a one-shot detecting device 31 is a device which gives a high-level signal to an OR 4 gate connected to the stack control counter 5 when an output signal of the OR 2 gate changes from a low level to a high level.

The embodiment constructed as described above operates as follows:

First, when a power source of the sewing machine is turned on, the value of the stack control counter 5 is set to "1" and the value of the counter latch device 4 to "0", while the display data RAM device 6 is cleared.

Next, when a pattern is selected by the pattern selection key 1, a pattern number signal corresponding to the selected pattern is generated in the pattern number generating device 2, and the signal is stored in the area of the pattern number stack 7 designated by the value "1" of the stack control counter 5.

Then, the pattern number signal is applied to the pattern address device 12. The pattern address device 12 is responsive to said pattern number signal to produce the initial address signal of the selected pattern which is latched in the latch device 13 and is then delivered to the comparator 17. Simultaneously the initial address signal is applied the pattern storage device 14 to address the initial address of a group of data of the selected pattern stored therein.

The upper shaft sensor 16 is operated in synchronism with the arm shaft of sewing machine to produce a timing signal (pulse) per rotation of the arm shaft. The timing buffer 15 is operated in synchronism with the timing pulse to sequentially read out the data of the selected pattern from the pattern storage device (memory) 14 by addressing the next addresses of the pattern storage device 14. This is disclosed in detail in the same applicant's U.S. Pat. No. 4,221,177.

The data computing device 29 computes the pattern data read out from the pattern storage device 14, and a manual counter value taken out of the area of the manual counter stack 11 specified by the value "1" counted by stack control counter 5, and delievers the computed data to the pattern forming device 30.

The pattern forming device 30 is operated in response to the computed data to from the selected pattern with an optional amplitude while the controller 28 is operated to control the rotation speed of the arm shaft of sewing machine.

Meanwhile, the pattern number signal taken out of the pattern number stack 7 is delieved to the straight stitch discriminator 18 to be discriminated as to whether or not the signal is for the straight stitch pattern.

When the signal is "YES", the straight stitch display data storage device 19 storing a plurality of needle positions as graphic drawings is enabled, and the graphic data of the straight stitch specified by the manual counter value taken out of the manual counter stack 11 is transmitted to the display data RAM device 6, while the taken out amplitude value defines a needle position of the straight stitch.

The display data RAM device 6 gives the display data to that area of the pattern display part 21 indicated by the stack control counter 5, and the graphic drawing thereof is displayed on the pattern display part 21.

In the case where the discrimination by the straight stitching discriminator 18 shows that the pattern is not the straight stitch, the graphic data of the pattern specified by the pattern number signal is taken out of the pattern display data storage device 20 and delivered to the display data RAM device 6.

The manual counter stack 11 has an area specified by the value of the stack control counter 5 for storing, therein a value of the manual counter 10, that is, a needle position at the time straight stitch or an amplitude value at the time of a pattern other than the straight stitch, which is selected arbitrarily by operation of the amplitude manual UP key 8 and the amplitude manual DOWN key 9.

The amplitude value display part 23 displays the display data of the manual display data storage device 22 specified by the pattern number of the pattern number stack 7 and by a manual value of the manual counter stack 11 which are shown by the stack control counter 5.

When the memory key 24 is operated many times, each time after a pattern has been selected, the value of the stack control counter 5 and of the counter latch device 4 are increased by "1" respectively, and a plurality of pattern number signals generated by the pattern number generating device 2 are sequentially latched in the pattern number stack 7 and a value of the manual counter 10 is latched in the manual counter stack 11 respectively in those areas as specified by the stack control counter 5.

Thus a plurality of patterns can be stored by repeated operations of the memory key 24 each time after each pattern has been selected by the pattern selected by the selection key 1 and/or after the amplitude manual UP key 8 or the amplitude manual DOWN key 9 has been operated to adjust the amplitude of the selected patterns. In this way, a combination of different patterns may be repeatedly produced.

The read key 25 is operated to check or identify the stored patterns after the storage of the patterns desired to be stitched has been completed.

One-shot detecting device 31 is actuated in response to the operation of the read key 25 to reset the stack control counter 5 is reset so that the counter is set to a value "1" designating the initial one of the stored patterns. Then the cursor composing device 27 is enabled to combine the cursor with the display data specified by the value "1" of the stack control counter 5, the display data RAM device 6.

When the memory key 24 is operated again, the value of the stack control counter 5 is increased by "1", and the display data in the display data RAM device 6 corresponding to this counter value and the cursor are combined. Thus the stored patterns can be checked up one after another even if the stored patterns are too many to be represented in the pattern display part 21.

The comparator 26 is enabled when the read key 25 or the controller 28 is operated, and when the value of the stack control counter 5 comes to coincide with the value of the counter latch device 4 indicating the number of storage by the repeated operation of the storage key 24, the one-shot detecting device 31 operated to reset the counter value of the stack control counter 5 to "1".

Next, when the controller 28 is operated to start a sewing operation, first the one-shot detecting device 31 operates to reset the stack control counter 5 to "1".

Then, the pattern forming device 30 is enabled, and the sewing operation is started in accordance with stitch data computed by the data computing device 29. When the arm shaft of sewing machine begins to rotate, the upper shaft sensor 16 is operated to produce a timing signal per rotation of the arm shaft.

In synchronism with the signal from the upper shaft sensor 16, the timing buffer 15 is operated to sequentially read out the initial and next addresses of the selected pattern from the pattern data storage device 14 to the data computing device 29.

When the last address of the selected pattern is read out and coincides with the initial address stored beforehand in the latch device 13 prior to the sewing operation, the comparator produces an accord signal. The stack control counter 5 is responsive to the accord signal to increment by "1", and the next, a pattern number is taken out of that area of the pattern number stack 7 specified by the above mentioned counter value and is transmitted to the address device 12, the straight stitch discriminator 18 and to the manual display data storage device 22.

The initial address of the pattern stored next is specified by the pattern number inputted to the address device 12.

Simultaneously, the cursor composing device 27 is enabled as described above, and thus a graphic drawing is displayed by the selected pattern display part 21, while an amplitude value is displayed by the amplitude value display part 23.

When the pattern selection key 1 is operated after the operation of the controller 28, that is, after the sewing operation, the one-shot device 3 is operated to reset the value of the counter latch device 4 to "0" and the value of the stack control counter 5 to "1" and to clear the display data RAM device 6.

Figure 3:
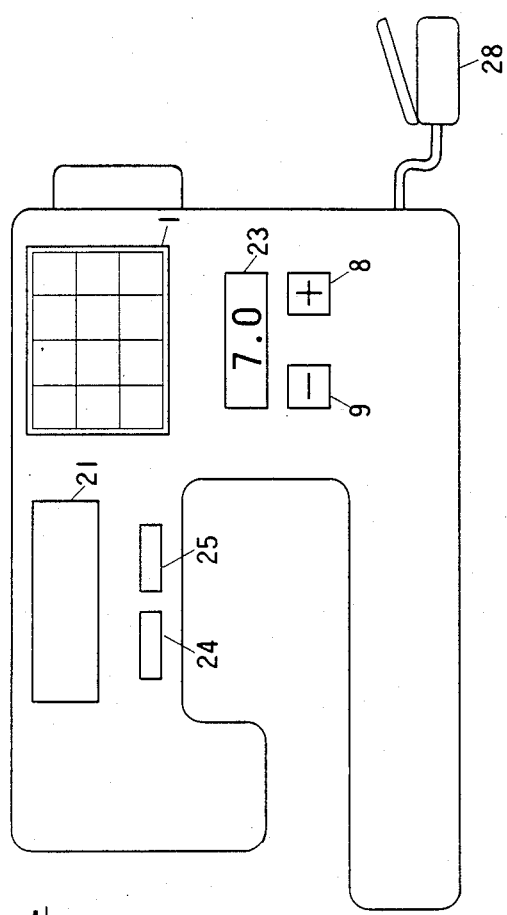

While the present invnetion has the construction as described above on the basis of the block diagram, it can be described as an actual operation of a sewing machine, as in the following:

First, when a pattern desired to be stitched is selected by the pattern selection key 1, in FIG. 3, the pattern is displayed on the selected pattern display part 21, while an amplitude value set by the operation of the amplitude manual UP key 8 or DOWN key 9 is displayed on the amplitude value display part 23.

Figure 4A:
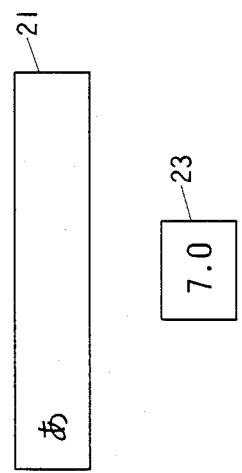

When a pattern such as " あ (the first letter of Japanese cursive character)" is selected and an amplitude value is set as 7, for instance, in this case, the graphic drawing of the pattern and the number of the amplitude value are displayed on the selected pattern display part 21 and the amplitude value display part 23 respectively as shown in FIG. 4(a), and when the straight stitch pattern is selected instead of the pattern " あ", amplitude value 7 is used to indicate the needle position of the straight stitch, and this numeral 7 is displayed in the amplitude value display part 23, while a graphic drawing indicating the straight stitch with the needle position thereof is displayed in the display part 21, as shown in FIG. 4(b).

When the memory key 24 is pushed subsequently, each time after a new pattern is selected, the selected patterns are stored one after another and are displayed adjacent to each other, as shown in FIG. 5(a). In this occasion, the number displayed in the display part 23 is the amplitude value of the pattern selected last, and a needle position is displayed, of course, when straight stitch is selected.

When the read key 25 is pushed after the selection and storage of patterns have been completed, the pattern check mode becomes effective, and the cursor is displayed under the pattern stored first, and the amplitude value of the pattern or the needle position of straight stitch is displayed in the amplitude value display part 23. By pushing the storage key 24 again, the cursor is shifted to the next pattern as shown in FIG. 5(b), and thus the selected patterns and the amplitude values of the patterns and/or needle positions of straight stitch can be checked one after another on the basis of the number displayed in the display part 23.

Figure 6:
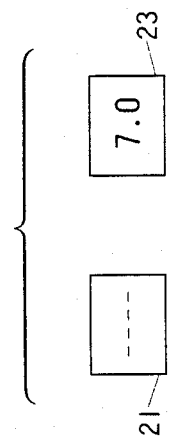
FIG. 6 is an illustration of a conventional display unit.

The construction and operation of the present invention are such as described above, and according thereto, the needle position of straight stitch is displayed as a graphic drawing in the display part 21 as shown in FIG. 4(b), while, in the conventional machine, the straight pattern and the needle position indicating numeral were simply displayed in the display parts 21 and 22, as shown in FIG. 6. It is therefore the effects of the present invention, that the recognition of said needle position is facilitated, that the mutual relationships of different needle positions of straight stitch stored in a plurality become clear, and that a sewing operation can thus be conducted smoothly.

What is claimed is:

1. A selected pattern display device of a sewing machine having a laterally elongated needle dropping hole of a predetermined range formed in a needle plate thereof, within which a vertically reciprocating needle may be swingable from minimum to maximum so that a straight stitch pattern and various zigzag patterns of variable amplitudes may be selectively produced, including pattern selecting means selectively operated to select stitch data for a stitch pattern selected from a plurality of different patterns including a straight stitch pattern stored in pattern storage means, amplitude selecting means selectively operated to select a numeral value for determining an amplitude of the selected pattern, and display means for displaying the selected pattern and the amplitude determining numeral value for the selected pattern, said selected pattern display device comprising:

(a) means for discriminating if the selected pattern is the straight stitch pattern, said discriminating means producing a signal when the selected pattern is the straight stitch pattern;

(b) memory means storing groups of display data for graphically displaying a plurality of patterns showing in different combinations the laterally elongated needle dropping hole and a needle position determined with respect to said needle dropping hole for producing a series of straight stitches, said memory means being responsive to said signal from said discriminating means and said numeral value produced from said amplitude selecting means to produce one of said groups of display data to said display means to thereby display therein one of said graphic patterns; and (c) stitch data converting means responsive to the stitch data for the straight stitch pattern read out from said pattern storage means and to said numeral value produced from said amplitude selecting means to determine the needle position with respect to said laterally elongated needled dropping hole in accordance with said numeral value produced from said amplitude selecting means.

2. The device as defined in claim 1 wherein said display means includes a first display part for displaying a selected stitch pattern and a second display part for displaying a selected amplitude value.

3. The device as defined in claim 1 wherein said amplitude selecting means includes a first device manually operated to increase said numeral value and a second device manually operated to decrease said numeral value.

4. The device as defined in claim 1 further comprising a second memory means storing groups of display data for a plurality of stitch patterns other than said straight stitch pattern, said second memory being responsive to a second signal produced from said discriminating means when a pattern other than said straight stitch pattern is selected, to thereby produce one of said groups of display data to said display means.

* * * * *